United States Patent
Jha et al.

(10) Patent No.: US 12,343,875 B2
(45) Date of Patent: Jul. 1, 2025

(54) SYSTEM AND METHOD FOR CONTROLLING AN OPERATION OF A MANIPULATION SYSTEM

(71) Applicant: Mitsubishi Electric Research Laboratories, Inc., Cambridge, MA (US)

(72) Inventors: Devesh Jha, Cambridge, MA (US); Arvind Raghunathan, Cambridge, MA (US); Yuki Shirai, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 288 days.

(21) Appl. No.: 18/188,217

(22) Filed: Mar. 22, 2023

(65) Prior Publication Data
US 2024/0316766 A1    Sep. 26, 2024

(51) Int. Cl.
B25J 9/16    (2006.01)

(52) U.S. Cl.
CPC ........... *B25J 9/1664* (2013.01); *B25J 9/1605* (2013.01)

(58) Field of Classification Search
CPC ...... B25J 9/1664; B25J 9/1605; B25J 9/1628; G05B 2219/42065
See application file for complete search history.

(56) References Cited

U.S. PATENT DOCUMENTS

| | | | |
|---|---|---|---|
| 2022/0187793 A1* | 6/2022 | Berntorp | G05B 13/048 |
| 2023/0173673 A1* | 6/2023 | Zhao | B23P 21/00 700/245 |

OTHER PUBLICATIONS

S. Spanogianopoulos, "Particle Swarm Optimization and Applications in Robotics: A Survey," 2018 9th International Conference on Information, Intelligence, Systems and Applications (IISA), Zakynthos, Greece, 2018, pp. 1-7, doi: 10.1109/IISA.2018.8633635. (Year: 2018).*

(Continued)

*Primary Examiner* — Adam R Mott
*Assistant Examiner* — Heather J Keniry
(74) *Attorney, Agent, or Firm* — Gene Vinokur

(57) ABSTRACT

The present disclosure provides a system and a method for controlling an operation of a manipulation system. The method comprises formulating an optimization problem based on a Stochastic Discrete-time Linear Complementarity Model (SDLCM) of a manipulation task, and a sample average approximation; solving the formulated optimization problem using an important-particle algorithm to compute an optimal state trajectory, an optimal feedforward control trajectory, an optimal complementarity variable trajectory, a state feedback gain, and a complementarity feedback gain; collecting, measurements indicative of a current state trajectory and a current complementarity variable trajectory; determining an online control input based on the optimal feedforward control trajectory, a deviation of the current state trajectory from the optimal state trajectory, a deviation of the current complementarity variable trajectory from the optimal complementarity variable trajectory, the state feedback gain, and the complementarity feedback gain; and controlling actuators of the manipulation system according to the online control input.

20 Claims, 13 Drawing Sheets

(56) References Cited

OTHER PUBLICATIONS

Contact Aware Controller Design for Complementarity Systems. Aydinoglu et al. https://arxiv.org/pdf/1909.11221.pdf.
Chance Constrained Optimization in Contact Rich Systems for Robust Manipulation. Shirai et al. https://arxiv.org/pdf/2203.02616.pdf.
Optimal Stochastic Vehicle Path Planning Using Covariance Steering. Okamoto et al. IEEE Robotics and Automation Letters. vol. 4, No. 3. Jul. 2019. 2276-2282.

* cited by examiner

Algorithm 1 ImportantParticle(Param, $\alpha, \beta, \gamma, \eta$)

1: $j = 0, \theta = \gamma, \Delta_\alpha = 0$
2: while $j \leq$ MAX-ITER and $(\Delta - \Delta_\alpha)^2 \geq \Delta_{th}$ and $\Delta > \Delta_{th}$ do
3:   Solve (17)–(20) with $N = \theta$
4:   if The obtained solution from (17)–(20) is feasible then
5:     Run MC simulation with $\alpha$ particles and calculate $\Delta_\alpha$
6:     Choose the $\eta$ worst particles that violate chance constraints.
7:   else
8:     Choose the random $\eta$ particles.
9:   $\theta = \theta + \eta$
10: Run MC simulation with $\beta$ particles and calculate $\Delta_\beta$.
11: return $z^{j*}, \phi^{j*}, K^*, L^*, \lambda^{j*}, t^{j*}, \zeta^{j*}, \omega_+^{j*}, \omega_-^{j*}, \Delta_\beta$

FIG. 3

SYSTEM AND METHOD FOR CONTROLLING AN OPERATION OF A MANIPULATION SYSTEM

TECHNICAL FIELD

The present disclosure relates generally to robotic manipulation, and more particularly to a system and a method for controlling an operation of a manipulation system.

BACKGROUND

In robotic systems, motion planning techniques are used to determine a trajectory for a robot to perform a manipulation task of moving an object to a target pose in an environment. The robotic system, for example, includes a robotic arm to manipulate the object to move the object to the target pose. The manipulation of the object leads to multiple contact formations, for example, a contact between the robotic arm and the object, and a contact between the object and the environment. Using the contacts efficiently can provide additional dexterity to the robotic system while performing complex manipulation tasks. To that end, constraints imposed by the contacts are desired to be incorporated in motion planning and controlling of the robotic systems.

However, uncertainty exists in the robotic systems, e.g., uncertainty in contact forces at point of the contacts, or coefficient of friction. The motion planning and controlling of such uncertain robotic systems becomes difficult as propagation of the uncertainty is challenging for the uncertain robotic systems. Therefore, there is a need for a system and a method for controlling the robotic system to perform the manipulation task in presence of the uncertainty.

SUMMARY

It is an object of some embodiments to provide a system and a method for controlling a manipulation system to perform a manipulation task in an environment. The manipulation system includes a robotic arm to manipulate an object in the environment. The manipulating task corresponds to manipulation of the object, such as pushing of an object or re-orientation of the object. The manipulation of the object may lead to multiple contact formations, for example, a contact between the object and the environment, a contact the robotic arm and the object, and the like. Some embodiments are based on the recognition that such a contact-rich manipulation system can be modeled efficiently using complementarity constraints. To that end, in an embodiment, a manipulation task is modeled using Stochastic Discrete-time Linear Complementarity Model (SDLCM) including the complementarity constraints.

However, uncertainty exists in the manipulation system, e.g., uncertainty in contact forces or coefficient of friction. The uncertainty in the manipulation system leads to stochastic complementarity systems. Some embodiments are based on the recognition that designing a controller for SDLCM with the stochastic complementarity constraints is difficult, as a state of the manipulation system and complementarity variables are implicitly related via the complementarity constraints (i.e., uncertainty in one leads to stochastic evolution of other), which in turn makes uncertainty propagation in the state challenging.

To that end, it an object of some embodiments to formulate an optimization problem for covariance control of SDLCM with the stochastic complementarity constraints. In some embodiments, for a manipulation task, it is desired to constrain the state within a particular set with a certain probability. Such a constraint may be formulated as a chance constraint, which has to be satisfied during control of the manipulation system. Therefore, it is an object of some embodiments to formulate a chance constrained optimization problem that satisfies the chance constraints over SDLCM with the stochastic complementarity constraints.

To realize such an objective, at first, a chance constrained optimization subject to the chance constraint, is formulated. The chance constrained optimization is solved approximately using Sample Average Approximation (SAA) by sampling the uncertainty. In particular, N realizations of the uncertainty (also referred to as particles) are obtained by sampling from the uncertainty distribution. In other words, the uncertainty distribution is approximated using a finite-dimensional distribution, which follows a uniform distribution on the uncertainty samples. Each particle is propagated using the SDLCM to estimate a mean and a covariance of the state.

Further, based on N particles and the estimated mean and covariance of the state, the chance constrained optimization is reformulated to produce a particle based optimization problem for the covariance control of SDLCM. As the uncertainty in the state leads to uncertainty in the complementarity variables and vice-versa, there exists a coupling between the state and the complementarity variables. Prior approaches have ignored the coupling during the uncertainty propagation for the manipulation system. Thus, the particles are used for the uncertainty propagation using SAA.

Additionally, some embodiments are based on the recognition that a control input for the manipulation system includes a feedforward term and a feedback term. The feedforward term controls a mean state of the manipulation system, and the feedback term controls covariance of the manipulation system. The feedback term is a function of a difference between a current state and a desired/optimal state of the manipulation system, i.e., deviation of the state from the desired state. However, SDLCM with the stochastic complementarity constraints includes complementarity variables and controlling both the state and the complementarity variables is critical for the contact-rich manipulation systems. Thus, the feedback term is formulated as a function of the deviation of the state from the desired state and deviation of the complementarity variables from desired complementarity variables. To that end, the control input is a function of the feedforward term, the deviation of the state from the desired state, and the deviation of the complementarity variables from desired complementarity variables. Further, the control input is based on a state feedback gain that controls the deviation of the state from the desired state and a feedback gain for the complementarity variables (also referred to as a complementarity feedback gain) that controls the deviation of the complementarity variables from desired complementarity variables.

The control input in the particle based optimization problem is replaced with the control input that is a function of the feedforward term, the state feedback gain, the complementarity feedback gain, the state deviation and the complementarity variables deviation. Such a particle based optimization problem is solved to determine an optimal state trajectory, an optimal feedforward control trajectory, an optimal complementarity variable trajectory, the state feedback gain, and the complementarity feedback gain. However, such a particle based optimization problem is computationally expensive to solve, because the particle based optimization problem has to be evaluated for each particle. Further, solving such a particle based optimization problem is difficult because individual optimization problem involves the complementarity constraint. Thus, every optimization problem becomes a mathematical program with complementarity constraints (MPCC) which is computationally challenging to solve.

Some embodiments of the present disclosure provide an important-particle algorithm for solving the particle based optimization problem in a computationally efficient manner. The important-particle algorithm samples important particles which may be most informative for chance constraint violation. For instance, the important-particle algorithm starts from a relatively small number of particles and solves the particle based optimization problem to determine a controller for the SDLCM. Further, using Monte-Carlo simulation, the controller is tested on each test particle of a number of test particles sampled from the uncertainty distribution, to determine particles that violate the chance constraint. Then, a fixed number of worst particles that violate the chance constraint are added to N particles that are used for solving the particle based optimization problem. N particles added with the worst articles are again used to solve the particle based optimization problem. Such a process is repeated until a termination condition is met. In such a manner, the number of particles that are used to solve the particle based optimization problem is reduced, which in turn reduces the computational burden.

During online control, measurements indicative of a current state trajectory and a current complementarity variable trajectory are collected from one or more sensors (such as tactile sensor or force sensor) associated with the manipulation system. Further, a deviation of the current state trajectory from the optimal state trajectory and a deviation of the current complementarity variable trajectory from the optimal complementarity variable trajectory, are computed. Furthermore, an online control input is determined as a combination of the optimal feedforward control trajectory and a feedback control to control a covariance of the states and the complementarity variables of the manipulation system. The feedback control is based on the deviation of the current state trajectory from the optimal state trajectory, the deviation of the current complementarity variable trajectory from the optimal complementarity variable trajectory, the state feedback gain, and the complementarity feedback gain. The determined online control input is submitted to actuators of the manipulation system to control the operation of the manipulation system.

Accordingly, one embodiment discloses a control system for controlling an operation of a manipulation system, wherein the manipulation system includes a robotic arm for performing a manipulation task of manipulating an object. The control system comprises at least one processor; and a memory having instructions stored thereon that cause the at least one processor to: formulate a particle based optimization problem for covariance control of the manipulation system, based on a Stochastic Discrete-time Linear Complementarity Model (SDLCM) of the manipulation task, and a sample average approximation; solve the formulated particle based optimization problem using an important-particle algorithm to compute an optimal state trajectory, an optimal feedforward control trajectory, an optimal complementarity variable trajectory, a state feedback gain, and a complementarity feedback gain; collect, from one or more sensors associated with the manipulation system, measurements indicative of a current state trajectory and a current complementarity variable trajectory; compute a deviation of the current state trajectory from the optimal state trajectory and a deviation of the current complementarity variable trajectory from the optimal complementarity variable trajectory; determine an online control input based on the optimal feedforward control trajectory and a feedback control to control a covariance of states and complementarity variables of the manipulation system, wherein the feedback control is based on the deviation of the current state trajectory from the optimal state trajectory, the deviation of the current complementarity variable trajectory from the optimal complementarity variable trajectory, the state feedback gain, and the complementarity feedback gain; produce control commands for actuators of the robotic arm based on the determined online control input; and operate the actuators of the robotic arm according to the determined online control input by transmitting control signals of the control commands to the robotic arm.

Accordingly, another embodiment discloses a method for controlling an operation of a manipulation system, wherein the manipulation system includes a robotic arm for performing a manipulation task of manipulating an object. The method comprises formulating a particle based optimization problem for covariance control of the manipulation system, based on a Stochastic Discrete-time Linear Complementarity Model (SDLCM) of the manipulation task, and a sample average approximation; solving the formulated particle based optimization problem using an important-particle algorithm to compute an optimal state trajectory, an optimal feedforward control trajectory, an optimal complementarity variable trajectory, a state feedback gain, and a complementarity feedback gain; collecting, from one or more sensors associated with the manipulation system, measurements indicative of a current state trajectory and a current complementarity variable trajectory; computing a deviation of the current state trajectory from the optimal state trajectory and a deviation of the current complementarity variable trajectory from the optimal complementarity variable trajectory; determining an online control input based on the optimal feedforward control trajectory and a feedback control to control a covariance of states and complementarity variables of the manipulation system, wherein the feedback control is based on the deviation of the current state trajectory from the optimal state trajectory, the deviation of the current complementarity variable trajectory from the optimal complementarity variable trajectory, the state feedback gain, and the complementarity feedback gain; producing control commands for actuators of the robotic arm based on the determined online control input; and operating the actuators of the robotic arm according to the determined online control input by transmitting control signals of the control commands to the robotic arm.

Accordingly, yet another embodiment discloses a non-transitory computer-readable storage medium embodied thereon a program executable by a processor for performing a method for controlling an operation of a manipulation system, wherein the manipulation system includes a robotic arm for performing a manipulation task of manipulating an object. The method comprises formulating a particle based optimization problem for covariance control of the manipulation system, based on a Stochastic Discrete-time Linear Complementarity Model (SDLCM) of the manipulation task, and a sample average approximation; solving the formulated particle based optimization problem using an important-particle algorithm to compute an optimal state trajectory, an optimal feedforward control trajectory, an optimal complementarity variable trajectory, a state feedback gain, and a complementarity feedback gain; collecting, from one or more sensors associated with the manipulation system, measurements indicative of a current state trajectory and a current complementarity variable trajectory; computing a deviation of the current state trajectory from the optimal state trajectory and a deviation of the current complementarity variable trajectory from the optimal complementarity variable trajectory; determining an online control input based on the optimal feedforward control trajectory and a feedback control to control a covariance of states and complementarity variables of the manipulation system, wherein the feedback control is based on the deviation of the current state trajectory from the optimal state trajectory, the deviation of the current complementarity variable trajectory from the optimal complementarity variable trajectory, the state feedback gain, and the complementarity feedback gain; producing control commands for actuators of the robotic arm based on the determined online control input; and operating the actuators of the robotic arm according to the determined online control input by transmitting control signals of the control commands to the robotic arm.

Accordingly, yet another embodiment discloses a control system for controlling an operation of a manipulation system, wherein the manipulation system includes a robotic arm for performing a manipulation task of manipulating an object. The control system comprises at least one processor; and a memory having instructions stored thereon that cause the at least one processor to collect, from one or more sensors associated with the manipulation system, measurements indicative of a current state trajectory and a current complementarity variable trajectory, and compute a deviation of the current state trajectory from an optimal state trajectory and a deviation of the current complementarity variable trajectory from an optimal complementarity variable trajectory. A particle based optimization problem is solved using an important-particle algorithm to obtain the optimal state trajectory, the optimal complementarity variable trajectory, an optimal feedforward control trajectory, a state feedback gain, and a complementarity feedback gain, and wherein the particle based optimization problem is based on a Stochastic Discrete-time Linear Complementarity Model (SDLCM) of the manipulation task and a sample average approximation. The least one processor further determines an online control input based on the optimal feedforward control trajectory and a feedback control to control a covariance of states and complementarity variables of the manipulation system, wherein the feedback control is based on the deviation of the current state trajectory from the optimal state trajectory, the deviation of the current complementarity variable trajectory from the optimal complementarity variable trajectory, the state feedback gain, and the complementarity feedback gain; produces control commands for actuators of the robotic arm based on the determined online control input; and operates the actuators of the robotic arm according to the determined online control input by transmitting control signals of the control commands to the robotic arm.

BRIEF DESCRIPTION OF THE DRAWINGS

FIG. 3 illustrates an important-particle algorithm, according to an embodiment to of the present disclosure.

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
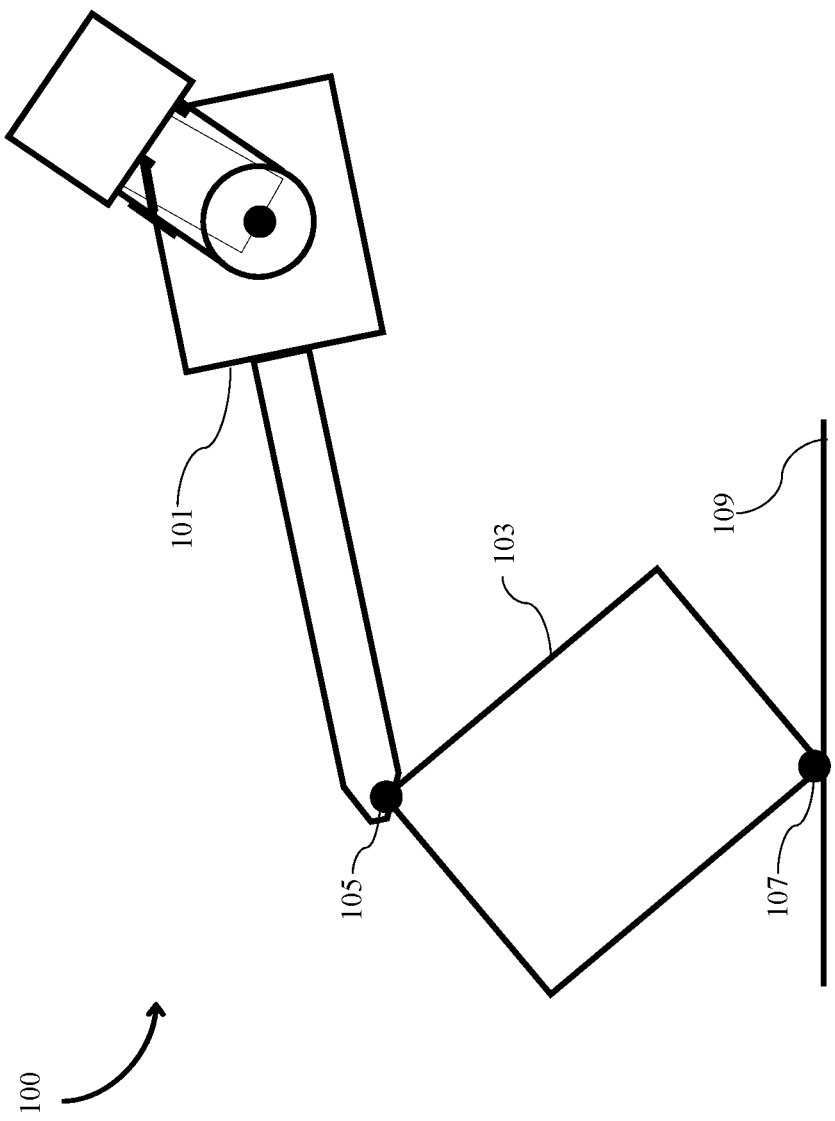
FIG. 1A illustrates a manipulation system, according to some embodiments of the present disclosure.

FIG. 1A illustrates a manipulation system 100, according to some embodiments of the present disclosure. The manipulation system 100 includes a robotic arm 101 configured to perform a manipulation task of manipulating an object 103. The manipulation task of manipulating the object 103 may correspond to pushing of the object 103 or re-orientation of the object 103. The manipulation of the object 103 leads to multiple contact formations, for example, a contact 105 between the robotic arm 101 and the object 103, and a contact 107 between the object 103 and an environment 109.

It is an object of some embodiments to design a control system for controlling an operation of such a contact-rich manipulation system 100. Such a control system is described below in FIG. 1B.

Figure 1B:
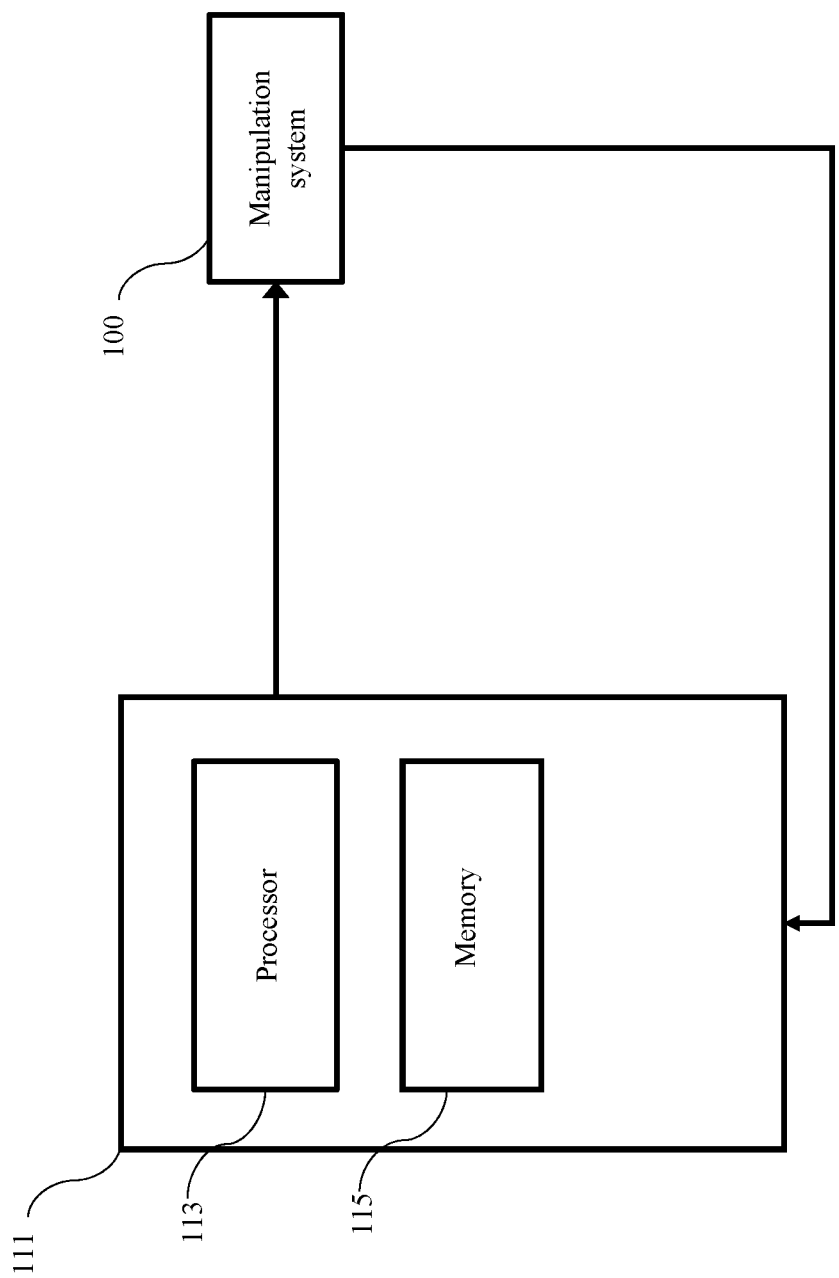
FIG. 1B shows a block diagram a control system for controlling an operation of the manipulation system, according to some embodiments of the present disclosure.

FIG. 1B shows a block diagram of a control system 111 for controlling the operation of the manipulation system 100, according to some embodiments of the present disclosure. The control system 111 includes a processor 113 and a memory 115. The processor 113 may be a single core processor, a multi-core processor, a computing cluster, or any number of other configurations. The memory 115 may include random access memory (RAM), read only memory (ROM), flash memory, or any other suitable memory systems. Additionally, in some embodiments, the memory 115 may be implemented using a hard drive, an optical drive, a thumb drive, an array of drives, or any combinations thereof. The control system 111 is communicatively coupled to the manipulation system 100. The control system 111 executes functions described below with reference to FIG. 1C and FIG. 1D for controlling the operation of the manipulation system 100.

Figure 1C:
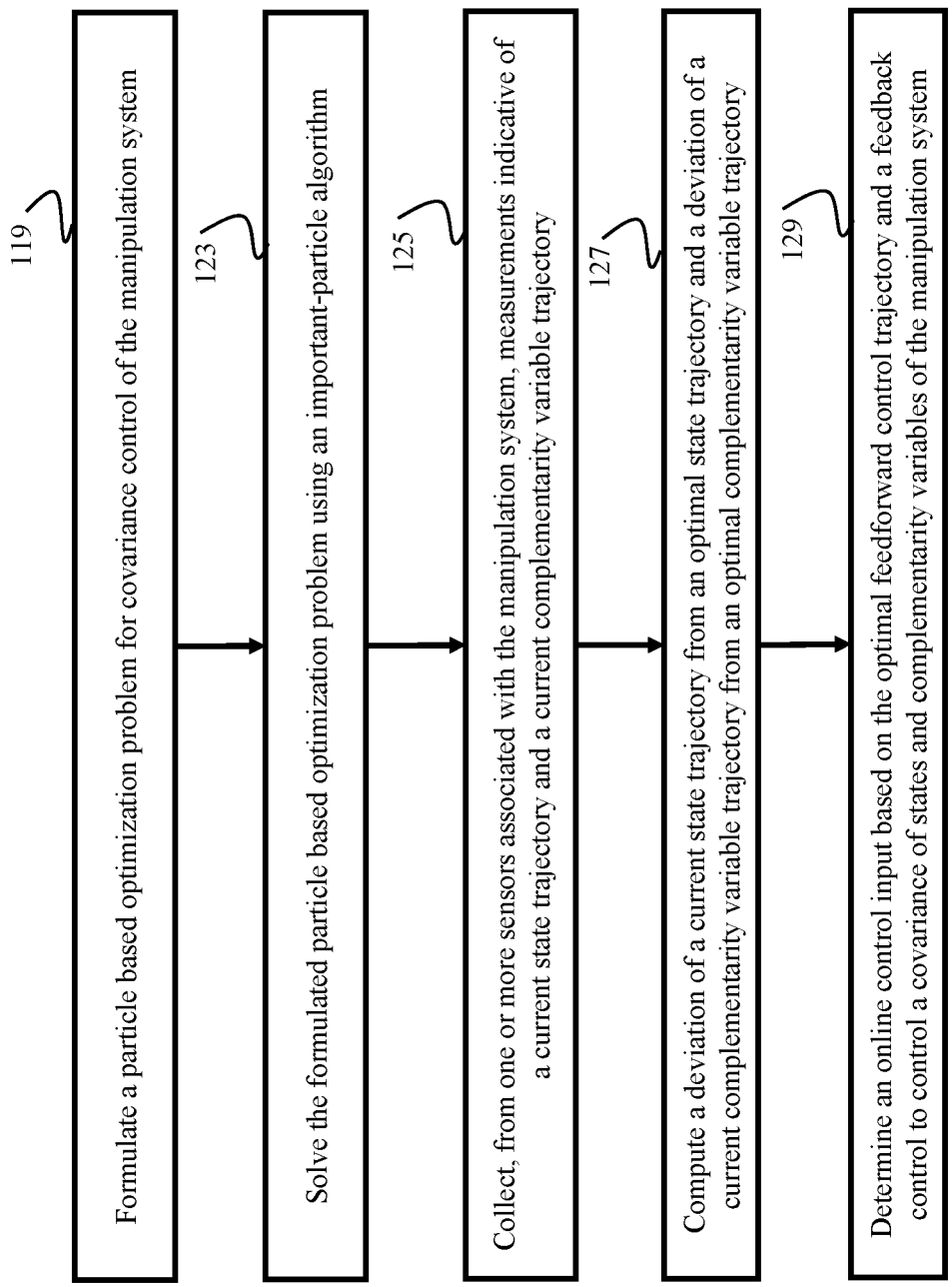
FIG. 1C shows a block diagram of functions executed by the control system for determining an online control input for controlling the operation of the manipulation system, according to an embodiment of the present disclosure.

FIG. 1C shows a block diagram 117 of functions executed by the control system 111 for determining an online control input for controlling the operation of the manipulation system 100, according to an embodiment of the present disclosure. At block 119, the processor 113 formulates a particle based optimization problem for covariance control of the manipulation system 100, based on a Stochastic Discrete-time Linear Complementarity Model (SDLCM) of the manipulation task, and a Sample Average Approximation (SAA). Some embodiments are based on the recognition that the contact-rich manipulation system 100 can be modeled efficiently using complementarity constraints. To that end, in an embodiment, the manipulation task is modeled using SDLCM including the complementarity constraints. According to an embodiment, SDLCM may be given as:

a.
$$x_{k+1} = A_k(\xi)x_k + B_k u_k + C_k(\xi)\lambda_{k+1} + g_k(\xi) + w_k(\xi) \quad (1)$$

b.
$$0 \leq \lambda_{k+1} \perp D_k(\xi)x_k + E_k u_k + F_k(\xi)\lambda_{k+1} + h_k(\xi) + l_k(\xi) \geq 0 \quad (2)$$

where k is a time-step index, $x_k \in \mathbb{R}^{n_x}$ is a state of the manipulation system 100, $u_k \in \mathbb{R}^{n_u}$ is a control input, and $\lambda k \in \mathbb{R}^{n_c}$ is a complementarity variable. The state ($x_k$) of the manipulation system 100 may correspond to a pose of the object 103, and the complementarity variable ($\lambda_k$) of the manipulation system 100 may correspond to a contact force between the robotic arm 101 and the object 103, and/or a contact force between the object 103 and the environment 109. x is defined as $x=[x_1, \ldots, x_T]$, $u=[u_0, \ldots, u_{T-1}]$, $\lambda=[\lambda_1, \ldots, \lambda^T]$. Parameter $\xi \sim \Xi$ is an uncertain parameter with distribution $\Xi$. In addition, $A_k(\xi) \in \mathbb{R}^{n_x \times n_x}$, $B_k \in \mathbb{R}^{n_x \times n_u}$, $C_k(\xi) \in \mathbb{R}^{n_x \times n_c}$, $g_k(\xi) \in \mathbb{R}^{n_x}$, $D_k(\xi) \in \mathbb{R}^{n_c \times n_x}$, $E_k \in \mathbb{R}^{n_c \times n_u}$, $F_k(\xi) \in \mathbb{R}^{n_c \times n_c}$, and $h_k(\xi) \in \mathbb{R}^{n_c}$ are all dependent on the uncertain parameter $\xi$. Notation $0 \leq a \perp b \geq 0$ denotes the complementarity constraints $a \geq 0$, $b \geq 0$, $ab=0$. Initial state $x_0(\xi)$ is also assumed to be uncertain. $\|x\|_Q^2$ means a quadratic term with a weighting matrix Q. In the present disclosure, it is assumed that $F_k(\xi)$ is a P-matrix for all k and $\xi$. Under such an assumption, there exists a unique solution $\lambda_{k+1}$ to (2) for each $\xi$ and any $u_k$, $x_k$. In other words, there exists a unique trajectory x and $\lambda$ for any realization of uncertainty $\xi \sim \Xi$ and controls u from every initial condition $x_0(\xi)$.

Since uncertainty exists in the manipulation system 100, e.g., uncertainty in contact forces or coefficient of friction, the uncertainty in the manipulation system 100 leads to stochastic complementarity systems. Some embodiments are based on the recognition that designing a controller for SDLCM with the stochastic complementarity constraints is difficult, as the state of the manipulation system 100 and the complementarity variables are implicitly related via the complementarity constraints (i.e., uncertainty in one leads to stochastic evolution of other), which in turn makes uncertainty propagation in the state challenging.

To that end, it an object of some embodiments to formulate an optimization problem for covariance control of SDLCM with the stochastic complementarity constraints. In some embodiments, for a manipulation task, it is desired to constrain the state within a particular set with a certain probability. Such a constraint may be formulated as a chance constraint, which has to be satisfied during control of the manipulation system 100. Therefore, it is an object of some embodiments to formulate a chance constrained optimization problem that satisfies the chance constraints over SDLCM with the stochastic complementarity constraints.

To realize such an objective, at first, a chance constrained optimization subject to the chance constraint, is formulated as given below $$\min_u \sum_{k=1}^{T} \|\mathbb{E}_{\xi \sim \Xi}[x_k(\xi, u)] - x_d\|_Q^2 + \sum_{k=0}^{T-1} \|u_k\|_R^2 \quad (3)$$

$$s.t. \ u_k \in \mathcal{U} \quad (4)$$

$$\Pr_{\xi \sim \Xi}(x(\xi, u) \in \mathcal{X}) \geq \Delta \quad (5)$$

where $Q=Q^T$ is positive semidefinite, $R=R^T$ is positive definite, $\mathcal{U}$ is a convex polytope consisting of a finite number of linear inequality constraints. $x_d$ is a target state at t=T. Set X represents a convex safe region where entire state trajectory has to lie in. It is assumed that $X=x \in \mathbb{R}^{n_x T}|g_i(x) \leq 0 \forall$ i=1, ..., ng.

The chance constrained optimization is solved approximately, by the processor 113, using SAA by sampling the uncertainty. In particular, N realizations of the uncertainty (also referred to as particles) are obtained by sampling from the distribution of the uncertainty. In other words, the uncertainty distribution is approximated using a finite-dimensional distribution, which follows a uniform distribution on the uncertainty samples. Each particle is propagated using SDLCM to estimate a mean and a covariance of the state. Further, based on N particles and the estimated mean and covariance of the state, the chance constrained optimization is reformulated to produce the particle based optimization problem for the covariance control of SDLCM.

For example, the processor 123 obtains N realizations of the uncertainty $\Xi^N = \xi^1, \ldots, \xi^N$ by sampling the distribution $\Xi$. Accordingly, the SAA for (3)-(5) is given as $$\min_u \sum_{k=1}^{T} \|\mathbb{E}_{\xi \sim \Xi^N}[x_k(\xi, u)] - x_d\|_Q^2 + \sum_{k=0}^{T-1} \|u_k\|_R^2 \quad (6)$$

$$s.t. \ u_k \in \mathcal{U} \quad (7)$$

$$\Pr_{\xi \sim \Xi^N}(x(\xi, u) \in \mathcal{X}) \geq \Delta. \quad (8)$$

As it can be observed in (6) and (8), the distribution E is replaced with $\Xi^N$ to simplify computation of expectation in an objective in (6) and a chance constraint (8). Further, the particle based optimization problem using N particles is given by:

$$\min_{x^i, u, \lambda^i} \sum_{k=1}^{T} \left\| \frac{1}{N} \sum_{i=1}^{N} x_k^i - x_d \right\|_Q^2 + \sum_{k=0}^{T-1} \|u_k\|_R^2 \quad (9)$$

$$s.t. \; x_{k+1}^i = A_k^i x_k^i + B_k u_k + C_k^i \lambda_{k+1}^i + g_k^i + w_k^i \quad (10)$$

$$0 \le \lambda_{k+1}^i \perp D_k^i x_k^i + E_k u_k + F_k^i \lambda_{k+1}^i + h_k^i + l_k^i \ge 0 \quad (11)$$

$$x_0^i = x_0(\xi^i) \quad (12)$$

$$u_k \in \mathcal{U} \quad (13)$$

$$\frac{1}{N} \sum_{i=1}^{N} \mathbb{1}(x^i \in \mathcal{X}) \ge \Delta \quad (14)$$

where $\mathbb{1}(\cdot)$ is an indicator function returning 1 when conditions in operand are satisfied and 0 otherwise. $x^i$ and $\lambda^i$ represent the state and complementarity variable trajectory, respectively, propagated from a particular set of particles $x)$, of where $\theta_k^i = [A_k^i, C_k^i, g_k^i, D_k^i, F_k^i, h_k^i, W_k^i, v_k^i]$. Using N trajectories obtained from N particles, mean of random variables is approximated as $$\mathbb{E}_{\xi \sim \Xi}[x_k(\xi, u)] \approx \frac{1}{n} \sum_{i=1}^{N} x_k^i, \; \mathbb{E}_{\xi \sim \Xi}[\lambda_k(\xi, u)] \approx \frac{1}{N} \sum_{i=1}^{N} \lambda_k^i.$$

In the particle based optimization problem, (3) is approximated using the mean as shown in (9). Chance constraint (5) is also approximated as (14) using N trajectories, which can be formulated as integer constraints. In other words, the chance constraint (5) is approximated using SAA.

In such a manner, the particle based optimization problem (9)-(14) is formulated based on SDLCM (1)-(2) and SAA (6)-(8).

Additionally, some embodiments are based on the recognition that the control input $u_k$ for the manipulation system 100 may be based on a feedforward term and a feedback term. The feedback term is a function of a difference between a current state and a desired/optimal state of the manipulation system 100, i.e., deviation of the state from the desired state. However, SDLCM with the stochastic complementarity constraints includes complementarity variables and controlling both the state and the complementarity variables is critical for the contact-rich manipulation system 100. Thus, the feedback term is formulated as a function of the deviation of the state from the desired state and deviation of the complementarity variables from desired complementarity variables. To that end, the control input is a function of the feedforward term, the deviation of the state from the desired state, and the deviation of the complementarity variables from desired complementarity variables. Further, the control input is based on a state feedback gain that controls the deviation of the state from the desired state and a feedback gain for the complementarity variables that controls the deviation of the complementarity variables from the desired complementarity variables.

Mathematically, the feedforward term and the feedback term are given as $$feedforward: u_k = v_k \quad (15)$$

$$feedback: u_k = v_k + K_k(x_k - \bar{x}_k) + L_k(\lambda_k - \bar{\lambda}_k) \quad (16)$$

where $K_k$ is the state feedback gain, and $L_k$ is the feedback gain for the complementarity variables (also referred to as a complementarity feedback gain).

The control input $u_k$ in the particle based optimization problem (9)-(14) is replaced with the feedback term (16) that is a function of the feedforward term $v_k$, the state feedback gain $K_k$, the feedback gain $L_k$, the state deviation $(x_k - \bar{x}_k)$ and complementarity variables deviation $(\lambda_k - \bar{\lambda}_k)$. Consequently, the following particle based optimization problem is obtained:

$$\min_{x^i, v, K, L, \lambda^i} \sum_{k=1}^{T} \|\bar{x}_k - x_d\|_Q^2 + \sum_{k=1}^{T-T} \|u_k\|_R^2 \quad (17)$$

$$s.t. \; x_{k+1}^i = (A_k^i + B_k K_k) x_k^i + B_k v_k + \quad (18)$$
$$(C_k^i + B_k L_k) \lambda_{k+1}^i + g_k^i - B_k K_k \bar{x}_k - B_k L_k \bar{\lambda}_{k+1} + w_k^i$$

$$0 \le \lambda_{k+1}^i \perp (D_k^i + E_k K_k) x_k^i + E_k v_k + \quad (19)$$
$$(F_k^i + E_k L_k) \lambda_{k+1}^i + h_k^i - E_k K_k \bar{x}_k - E_k L_k \bar{\lambda}_{k+1} + l_k^i \ge 0$$

$$(12), (13), (14) \quad (20)$$

However, the above particle based optimization problem (17)-(20) is computationally expensive to solve, because the particle based optimization problem has to be evaluated for each particle. Further, solving such a particle based optimization problem is difficult because individual optimization problem involves the complementarity constraint. Thus, every optimization problem becomes a mathematical program with complementarity constraints (MPCC) which is computationally challenging to solve.

Some embodiments of the present disclosure provide an important-particle algorithm for solving the particle based optimization problem in a computationally efficient manner. The important-particle algorithm is explained in detail in FIG. 3

To this end, at block 123, the processor 113 solves the formulated particle based optimization problem (17)-(20) using the important-particle algorithm to compute an optimal state trajectory, an optimal feedforward control trajectory, an optimal complementarity variable trajectory, the state feedback gain $K_k$, and the feedback gain $L_k$.

Further, at block 125, the processor 113 collects, from one or more sensors associated with the manipulation system 100, measurements indicative of a current state trajectory and a current complementarity variable trajectory. For example, the one or more sensors associated with the manipulation system 100 correspond to tactile sensors, force sensors, or torque sensors. The one or more sensors may be mounted on the robotic arm 101. For instance, the tactile sensors may be co-located at fingers of gripper of the robotic arm 101. The processor 113 collects measurements from the one or more sensors. The collected measurements are indicative of the current state trajectory and the current complementarity variable trajectory. The current state trajectory includes a current pose of the object 103, and the current complementarity variable trajectory includes a current contact force between the robotic arm 101 and the object 103.

At block 127, the processor 113 computes a deviation of the current state trajectory from the optimal state trajectory and a deviation of the current complementarity variable trajectory from the optimal complementarity variable trajectory.

At block 129, the processor 113 determines an online control input based on the optimal feedforward control trajectory and a feedback control to control a covariance of the states and the complementarity variables of the manipulation system 100. The feedback control is based on the deviation of the current state trajectory from the optimal state trajectory, the deviation of the current complementarity variable trajectory from the optimal complementarity variable trajectory, the state feedback gain $K_k$, and the feedback gain $L_k$.

Figure 1D:
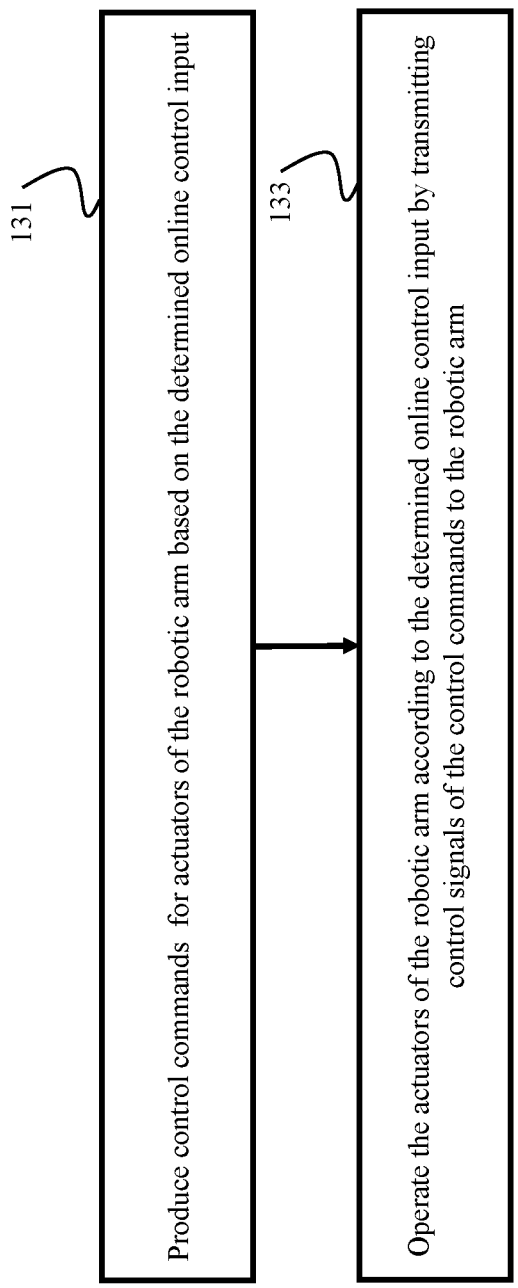
FIG. 1D shows a block diagram of functions executed by the control system for controlling the operation of the manipulation system, based on the determined online control input, according to an embodiment of the present disclosure.

FIG. 1D shows a block diagram of functions executed by the control system 111 for controlling the operation of the manipulation system 100, based on the determined online control input, according to an embodiment of the present disclosure. At block 131, the processor 113 produces control commands for actuators of the robotic arm 101 based on the determined online control input. At block 133, the processor 113 operates the actuators of the robotic arm 101 according to the determined online control input by transmitting control signals of the control commands to the robotic arm 101, to control the operation of the manipulation system 100, e.g., the manipulation task, even in presence of the uncertainty.

Alternatively, in some embodiments, the particle based optimization problem (17)-(20) is formulated and solved offline, i.e., in advance, and the online control input is determined online, i.e., during real-time operation. Such an embodiment is described below with reference to FIG. 2A and FIG. 2B.

Figure 2A:
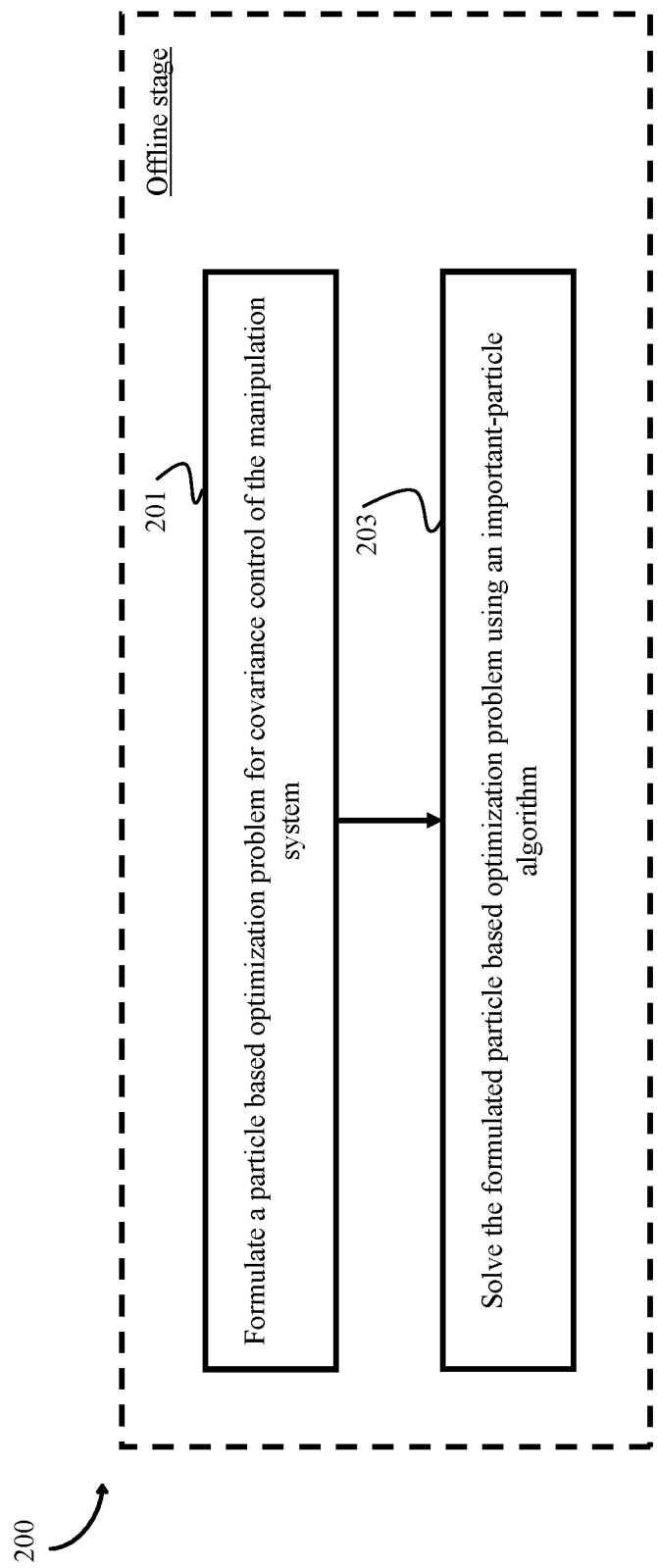
FIG. 2A shows a block diagram of functions executed during offline stage, according to an embodiment of the present disclosure.

FIG. 2A shows a block diagram 200 of functions executed during offline stage, according to an embodiment of the present disclosure.

During offline stage, at block 201, the particle based optimization problem (17)-(20) is formulated as described above in FIG. 1C. Further, at block 203, the particle based optimization problem (17)-(20) is solved using the important-particle algorithm to compute the optimal state trajectory, the optimal feedforward control trajectory, the optimal complementarity variable trajectory, the state feedback gain $K_k$, and the feedback gain $L_k$.

Figure 2B:
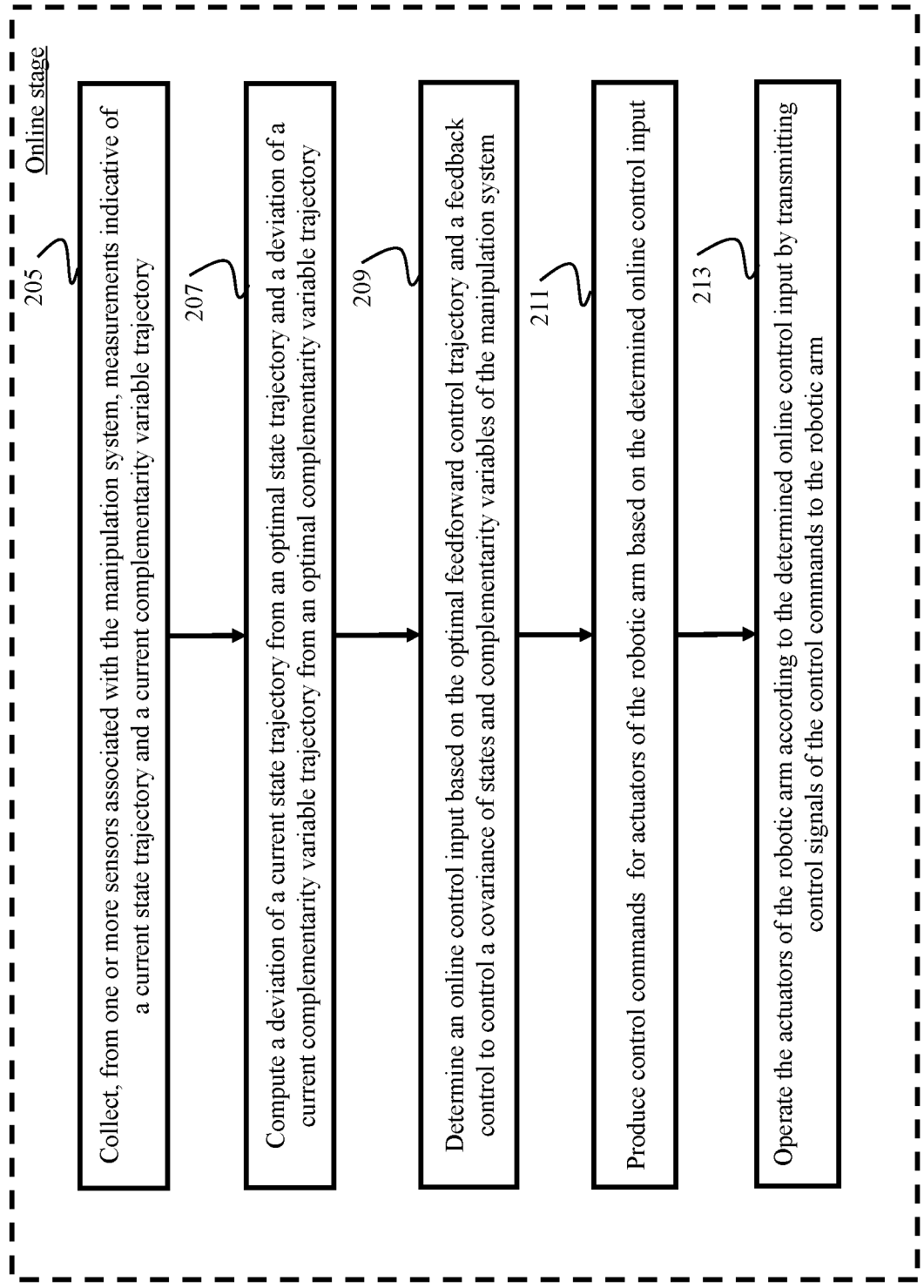
FIG. 2B shows a block diagram of functions executed during online stage, according to an alternate embodiment of the present disclosure.

FIG. 2B shows a block diagram of functions executed during online stage, according to an embodiment of the present disclosure. During online stage, at block 205, the processor 113 collects, from the one or more sensors associated with the manipulation system 100, the measurements indicative of the current state trajectory and the current complementarity variable trajectory. The one or more sensors associated with the manipulation system 100 include tactile sensors, force sensors, and/or torque sensors. The one or more sensors may be mounted on the robotic arm 101. At block 207, the processor 113 computes the deviation of the current state trajectory from the optimal state trajectory and the deviation of the current complementarity variable trajectory from the optimal complementarity variable trajectory computed during the offline stage. At block 209, the processor 113 determines the online control input based on the optimal feedforward control trajectory and the feedback control to control the covariance of the states and the complementarity variables of the manipulation system 100. The feedback control is based on the deviation of the current state trajectory from the optimal state trajectory, the deviation of the current complementarity variable trajectory from the optimal complementarity variable trajectory, the state feedback gain $K_k$ and the feedback gain $L_k$ that are computed during the offline stage. At block 211, the processor 113 produces control commands for actuators of the robotic arm 101 based on the determined online control input. At block 213, the processor 113 operates the actuators of the robotic arm 101 according to the determined online control input by transmitting control signals of the control commands to the robotic arm 101, to control the operation of the manipulation system 100, e.g., the manipulation task.

Further, the important-particle algorithm that is used to solve the particle based optimization problem (17)-(20) is explained below with reference to FIG. 3.

FIG. 3 illustrates an important-particle algorithm 300, according to an embodiment to of the present disclosure. The important-particle algorithm 300 is iteratively executed until a termination condition is met. The termination condition may be a number of iterations. During first iteration, at step 301, the processor 113 solves the particle based optimization problem (17)-(20) with an initial number γ of particles to determine a controller. The initial number of particles is a hyperparameter of the important-particle algorithm 300.

Further, at step 303, the processor 113 checks if the solution from the particle based optimization problem (17)-(20), i.e., the determined controller, is feasible. If the solution from the particle based optimization problem (17)-(20) is feasible, then, at step 305, the processor 113 executes, based on the determined controller, Monte-Carlo (MC) simulation for each test particle of a number α of test particles sampled from the uncertainty distribution, to determine particles that violate the chance constraint, and calculates an empirical probability of chance constraint violation $\Delta_\alpha$. If $\Delta_\alpha$ is close to or greater than a user defined threshold $\Delta$, then the processor 113 terminates while loop and, at step 313, runs MC simulation, based on the determined controller, with a number β of particles. Otherwise, at step 307, the processor 113 chooses a number n of worst particles from the determined particles that violate the chance constraint, based on how much the particles violate the chance constraints. For instance, particles that violate the chance constraints maximum are selected as the worst particles. Further, at step 311, the processor 113 adds the number n of worst particles to a number of particles θ used to determine the controller.

If the solution from the particle based optimization problem (17)-(20) is infeasible, then, at step 309, the processor 113 randomly chooses a number n of worst particles. Further, at step 311, the processor 113 adds the number n of worst particles to the number of particles θ used to determine the controller. The number of particles θ added with the number n of worst particles is used to solve the particle based optimization problem (17)-(20) in next iteration. The number γ of particles added in each iteration is a hyperparameter of the important-particle algorithm and is computed empirically. In such a manner, the number of particles that is used to solve the particle based optimization problem (17)-(20) is reduced, which in turn reduces the computational burden.

Some embodiments are based on further realization that the particle based optimization problem (17)-(20) can also be solved using Non-Linear Programming (NLP). To solve the particle based optimization problem (17)-(20) using NLP, integer constraints (14) have to be solved in NLP manner. To solve the integer constraints (14) in NLP manner, following bilevel optimization problem is formulated:

$$\min_{x^i,y,K,L,\lambda^i,t^i,z^*} \sum_{k=1}^{T} \|\bar{x}_k - x_d\|_Q^2 + \sum_{k=0}^{T-1} \|u_k\|_R^2 \quad (21)$$

$$\text{s.t. } (18), (19), (20) \quad (22)$$

$$\forall j = 1, \ldots, n_g, g_j(x) \le t^i, \quad (23)$$

$$\frac{1}{N}\sum_{i=1}^{N} z^{i,*} \ge \Delta \quad (24)$$

$$\forall i = 1, \ldots, N, z^{i,*} = \arg\min_{z^j} t^i z^j \mid 0 \le z^j \le 1 \quad (25)$$

A time-invariant parameter $t^i \in \mathbb{R}^1$ is introduced for each set of trajectory realization i. If $x^i \in X$, $t^i \ge -\epsilon$ with $\epsilon \ge 0$. In contrast, if $x \notin X$, $t^i > 0$. Such a condition is encoded in (23). There are N lower-level optimization problems (25), where each optimization problem is formulated as linear programming. $z^i \in \mathbb{R}^1$ is a decision variable used in i-th lower-level optimization problem. (25) is for counting a number of trajectory realizations that are inside X. An optimal solution of (25) can be as follows:

$$z^i = \begin{cases} 1, & t^i < 0 \\ [0, 1], & t^i = 0 \\ 0, & t^i > 0 \end{cases} \quad (26)$$

Therefore, if $t^i < 0$, (23) argues that $x^i \in X$ and thus i-th trajectory propagated from i-th particles is counted as one. If $t^i = 0$, (23) argues $x^i \in X$ ($x^1$ lies on boundary of X) and thus this i-th trajectory propagated from i-th particles is counted as one. If $t^i > 0$, then $x^i$ is not within X, and thus this i-th trajectory propagated from i-th particles is counted as zero. Then (24) considers the approximated chance constraints.

Since the lower-level optimization problems are formulated as N linear programming problems, the bilevel optimization problem can be efficiently solved using Karush-Kuhn-Tucker (KKT) condition as follows $$\min_{x^i,y,K,L,\lambda^i,t^i,z^{i,*},w^i_+,w^i_-} (21) \quad (27)$$

$$\text{s.t. } (21), (22), (23) \quad (28)$$

$$\forall i = 1, \ldots, N, 0 \le z^{i,*} \le 1, w^i_+, w^i_- \ge 0 \quad (29)$$

$$w^i_+(z^{i,*} - 1) = 0, w^i_-(z^{i,*}) = 0, \quad (30)$$

$$t^i = w^i_+ - w^i_- = 0 \quad (31)$$

where $w_+^i$, $w_-^i$ are Lagrange multipliers associated with $z^i - 1 \le 0$, $-z^i \le 0$, respectively. In conclusion, a single-level nonlinear programming problem with complementarity constraints is obtained, which can be efficiently solved using an off-the-shelf solver, e.g., Interior Point OPTimizer (IPOPT).

Figure 4:
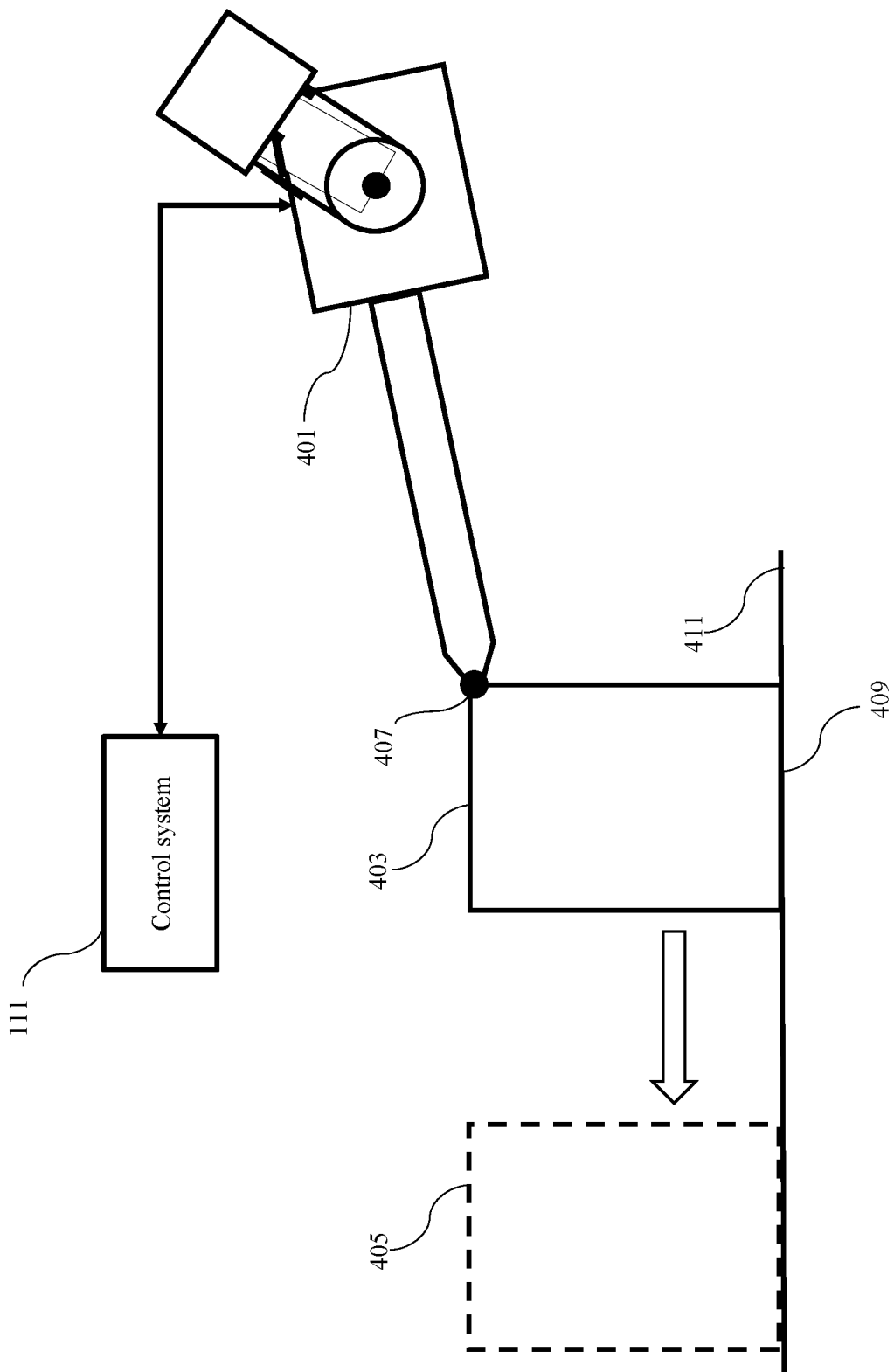
FIG. 4 illustrates a manipulation task of pushing an object to a target location, according to an embodiment of present disclosure.

Some embodiments are based on the realization that the control system 111 can be used to control a manipulation task of pushing an object to a target location, even in presence of the uncertainty. FIG. 4 illustrates the manipulation task of pushing an object 403 to a target location 405, according to an embodiment of present disclosure. A robotic arm 401 is communicatively coupled to the control system 111. The manipulation task of pushing the object 403 to the target location 405 leads to contact formations, such as, a contact 407 between the robotic arm 401 and the object 403, and a contact 409 between the object 403 and an environment 411. Uncertainty exists in contact forces at point of the contact 407 and the contact 409, and the coefficient of friction. The control system 111 determines an online control input, as described above in FIG. 1C. Further, the control system 111 controls the robotic arm 401 based on the determined online control input, causing the robotic arm 401 to push the object 403 to the target location 405 in presence of the uncertainty.

Additionally, the control system 111 can be used for re-orientation of objects of different size and shape.

Figure 5A:
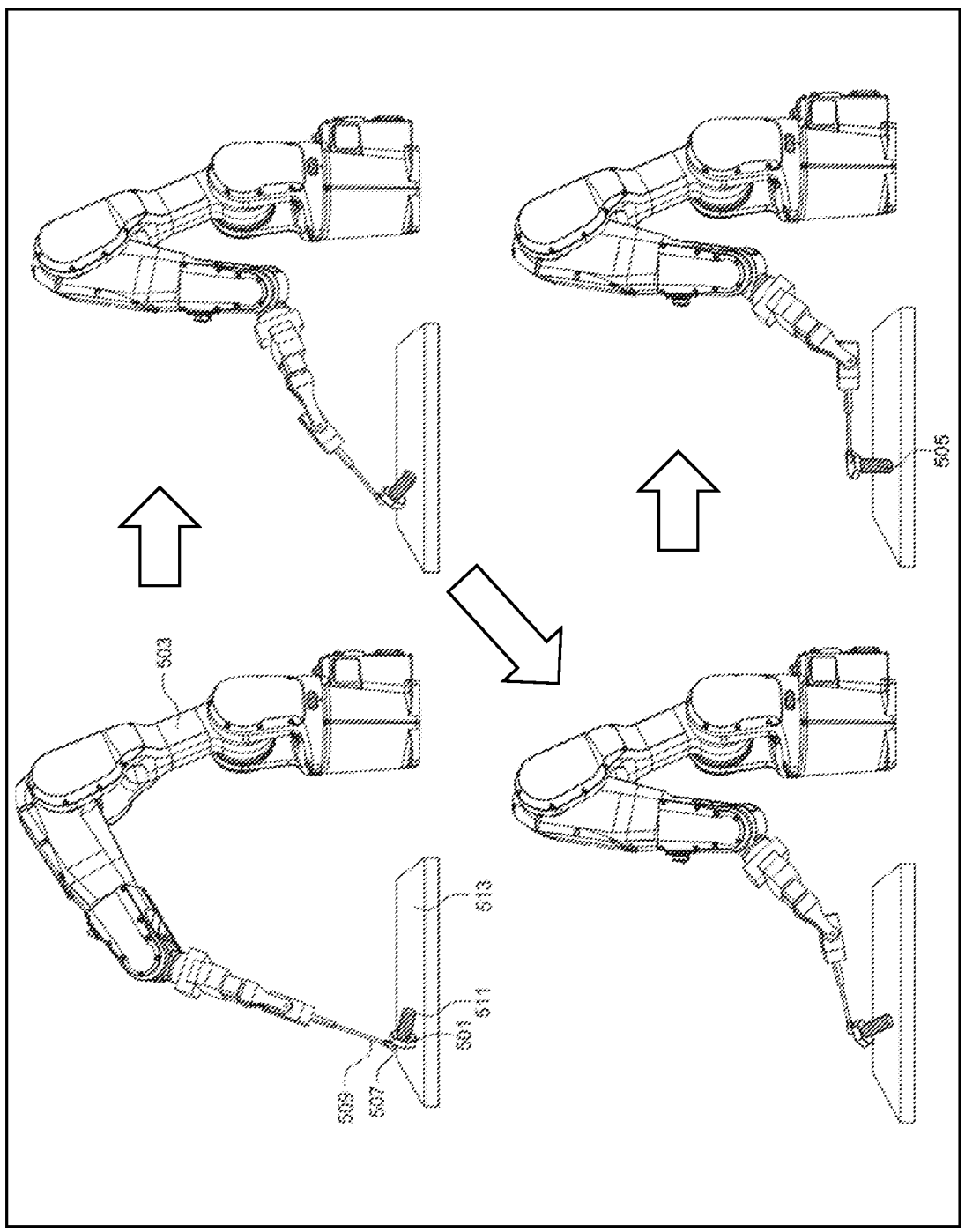
FIG. 5A illustrates re-orientation of a bolt, according to some embodiments of the present disclosure.

FIG. 5A illustrates re-orientation of a bolt 501, according to some embodiments of the present disclosure. The control system 111 (not shown in figure) is communicatively coupled to a robotic arm 503. As can be seen from FIG. 5A, the control system 111 controls the robotic arm 503 such that the bolt 501 is moved to a target pose 505, without losing a contact 507 between a tool 509 held by the robotic arm 503 and the bolt 501 and a contact 511 between the bolt 501 and an environment 513, and in presence of uncertainty in contact forces at point of the contact 507 and the contact 511.

Figure 5B:
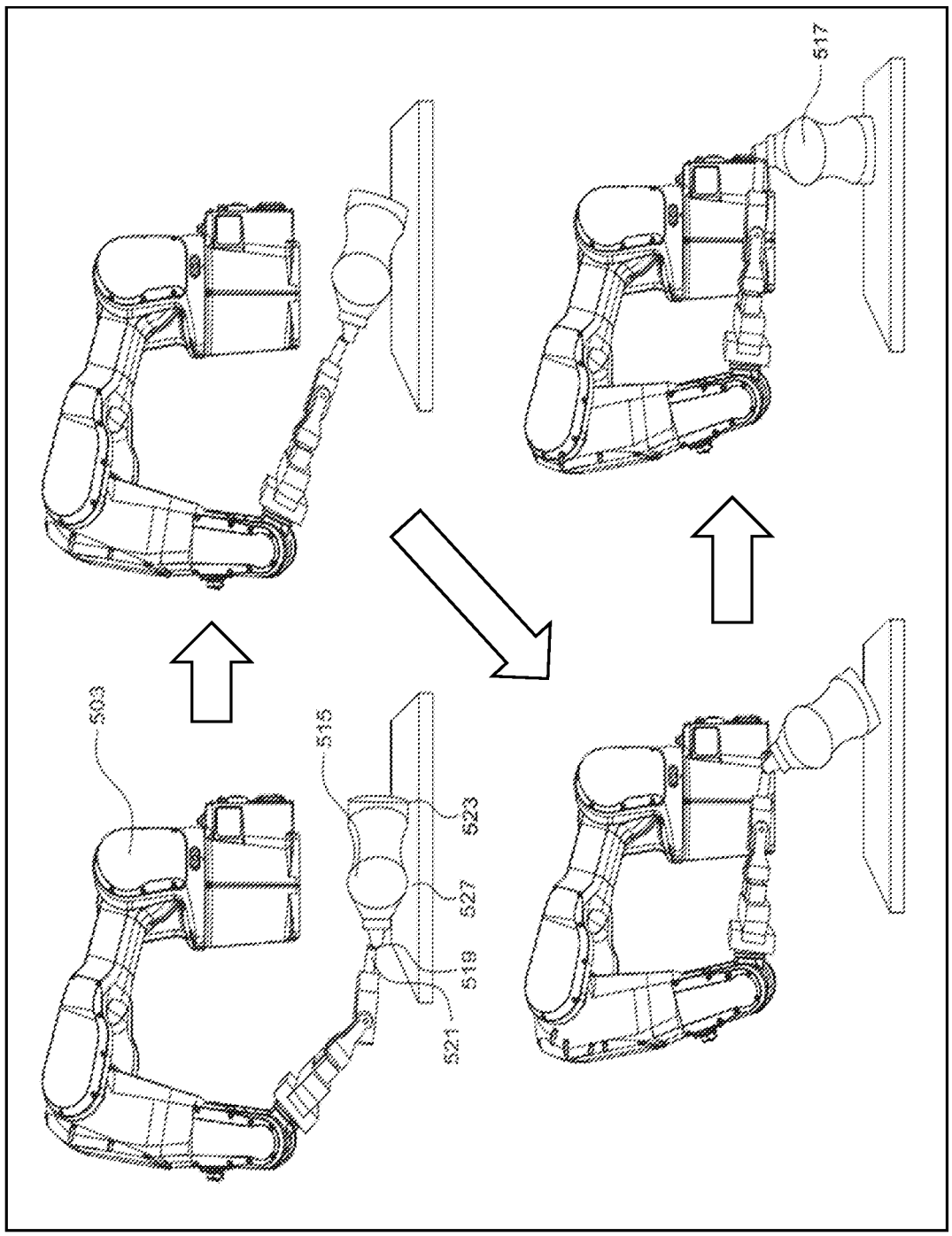
FIG. 5B illustrates re-orientation of a bottle, according to some embodiments of the present disclosure.

FIG. 5B illustrates re-orientation of a bottle 515, according to some embodiments of the present disclosure. As can be seen from FIG. 5B, the control system 111 (not shown in figure) controls the robotic arm 503 such that the bottle 515 is moved to a target pose 517, without losing a contact 519 between a tool 521 held by the robotic arm 503 and the bottle 515 and a contact 523 between the bottle 515 and an environment 527, and in presence of uncertainty in contact forces at point of the contact 519 and the contact 523.

Since the control system 111 can control the robotic arm 503 to manipulate objects of different size and shape, such as the bolt 501 and the bottle 515, without losing the contacts during the manipulation and in the presence of the uncertainty, the control system 111 can be used to control the robotic arm 503 to perform objects arrangement task.

Figure 5C:
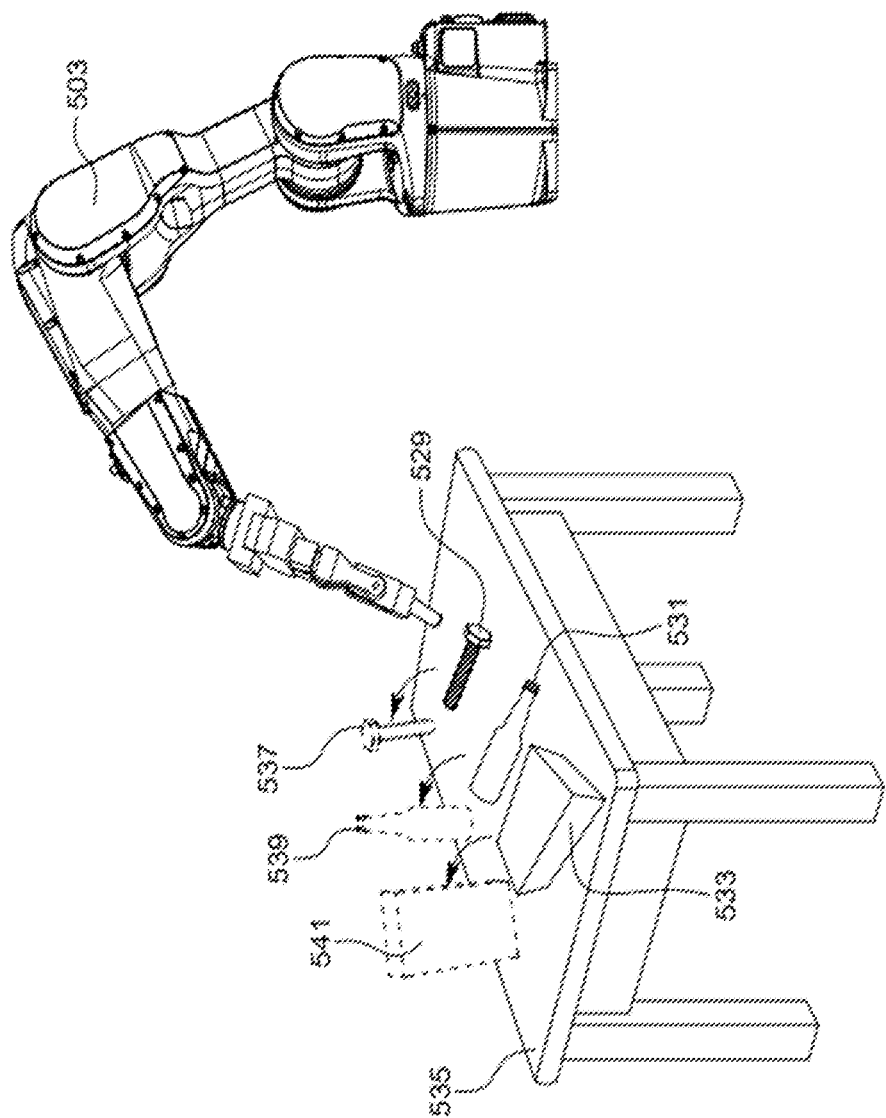
FIG. 5C illustrates an objects arrangement task, according to some embodiments of the present disclosure.

FIG. 5C illustrates an objects arrangement task, according to some embodiments of the present disclosure. Objects, such as a bolt 529, a bottle 531, and a box 533, are situated on a table 535. The control system 111 controls the robotic arm 503 to move each object to its respective target pose, to arrange the objects on the table 535. For example, the bolt 529, the bottle 531, and the box 533 are moved to target poses 537, 539, and 541, respectively. To that end, the control system 111 can arrange each object according to its respective target pose, irrespective of an initial pose of each object.

Additionally, the control system 111 can be used to handle the object to assemble the object for manufacturing a product using one or a combination of pushing, reorienting, and gripping the object. Such an embodiment is described below in FIG. 5D.

Figure 5D:
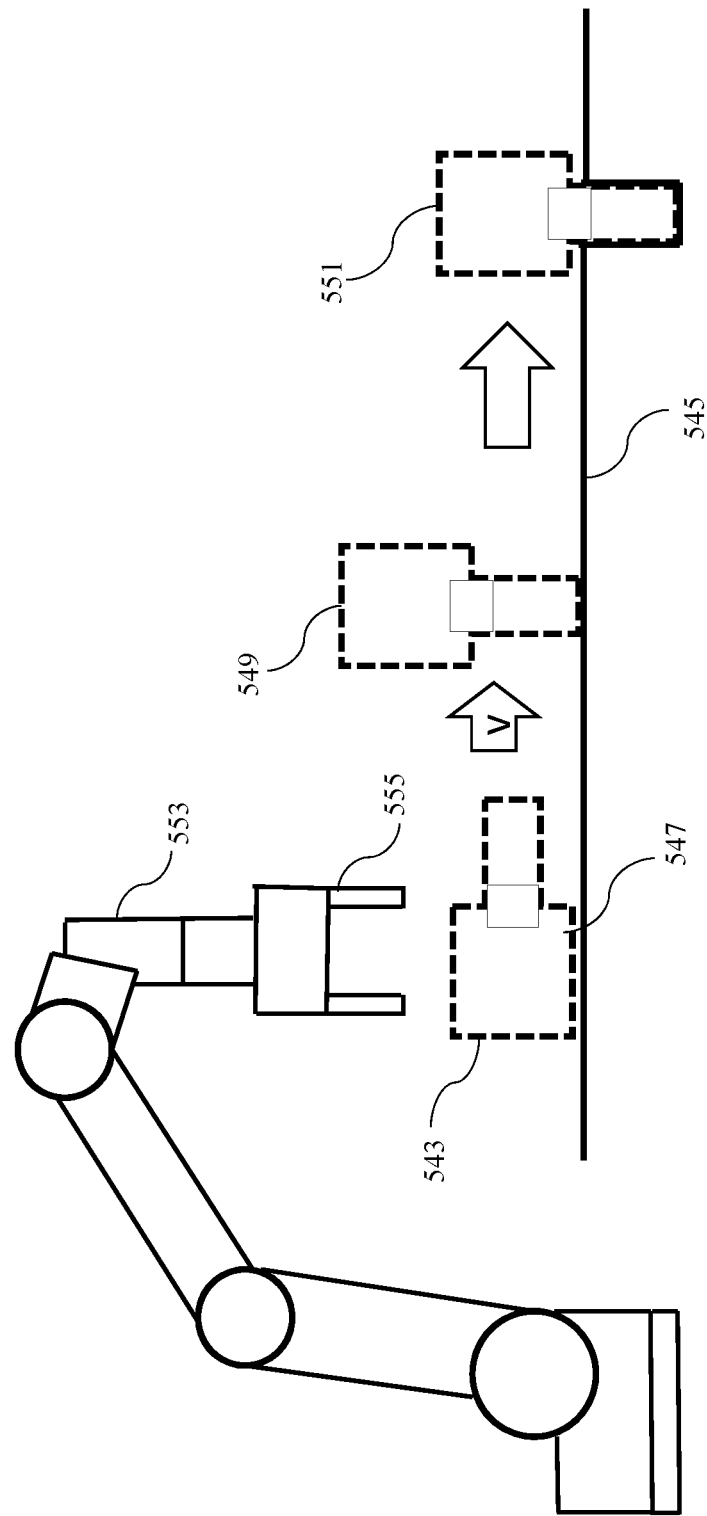
FIG. 5D illustrates an assembly task, according to some embodiments of the present disclosure.

FIG. 5D illustrates an assembly task, according to some embodiments of the present disclosure. The object, such as a peg 543 is placed on a tabletop surface 545 with partially known friction coefficients. An assembly task includes manipulating the peg 543 in an initial configuration 547 to a configuration 549, and then to a configuration 551. The control system 111 controls robotic arm 553 and gripper 553 such that the gripper 555 holds the peg 543, and reorients it to the configuration 549 and then to the configuration 551, so that the assembly task is performed.

Figure 6:
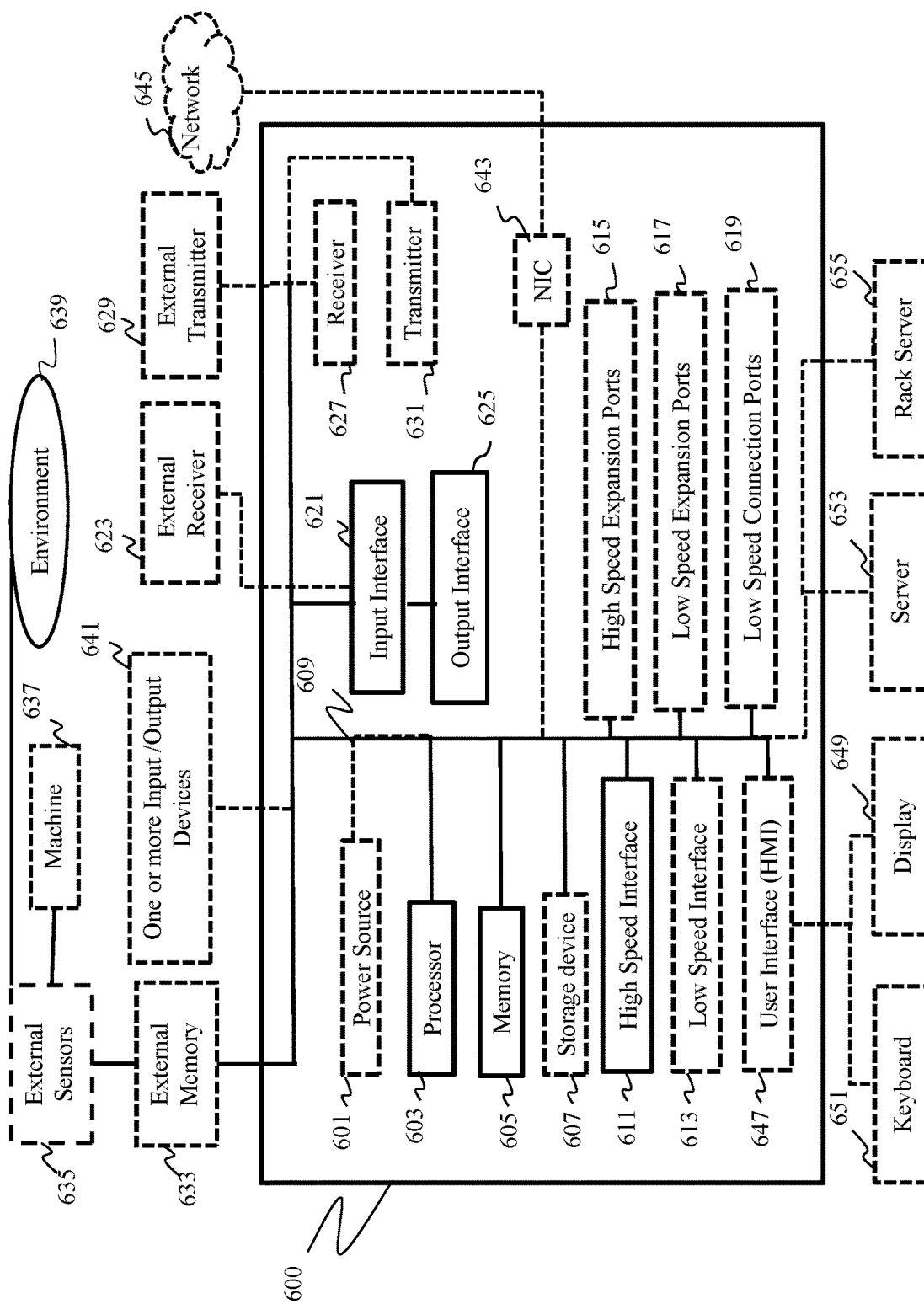
FIG. 6 is a schematic illustrating a computing device for implementing the control system of the present disclosure.

FIG. 6 is a schematic illustrating a computing device 600 for implementing the control system 111 and methods of the present disclosure. The computing device 600 includes a power source 601, a processor 603, a memory 605, a storage device 607, all connected to a bus 609. Further, a high-speed interface 611, a low-speed interface 613, high-speed expansion ports 615 and low speed connection ports 617, can be connected to the bus 609. In addition, a low-speed expansion port 619 is in connection with the bus 609. Further, an input interface 621 can be connected via the bus 609 to an external receiver 623 and an output interface 625. A receiver 627 can be connected to an external transmitter 629 and a transmitter 631 via the bus 609. Also connected to the bus 609 can be an external memory 633, external sensors 635, machine(s) 637, and an environment 639. For instance, the machine(s) 637 can be the manipulation system 100 that includes the robotic arm 101 to perform manipulation tasks, such as, pushing the object (such as the object 103), reorientation of the object, gripping the object, or handling the object to assemble the object for manufacturing a product using a combination of pushing, reorienting, and gripping the object. Further, one or more external input/output devices 641 can be connected to the bus 609. A network interface controller (NIC) 643 can be adapted to connect through the bus 609 to a network 645, wherein data or other data, among other things, can be rendered on a third-party display device, third party imaging device, and/or third-party printing device outside of the computer device 600.

The memory 605 can store instructions that are executable by the computer device 600 and any data that can be utilized by the methods and systems of the present disclosure. The memory 605 can include random access memory (RAM), read only memory (ROM), flash memory, or any other suitable memory systems. The memory 605 can be a volatile memory unit or units, and/or a non-volatile memory unit or units. The memory 605 may also be another form of computer-readable medium, such as a magnetic or optical disk.

The storage device 607 can be adapted to store supplementary data and/or software modules used by the computer device 600. The storage device 607 can include a hard drive, an optical drive, a thumb-drive, an array of drives, or any combinations thereof. Further, the storage device 607 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 603), perform one or more methods, such as those described above.

For example, the processor 603 solves the particle based optimization problem (17)-(20) using the important-particle algorithm to compute the optimal state trajectory, the optimal feedforward control trajectory, the optimal complementarity variable trajectory, the state feedback gain $K_k$, and the feedback gain $L_k$. The processor 603 further collects the measurements indicative of the current state trajectory and the current complementarity variable trajectory. The processor 603 further computes the deviation of the current state trajectory from the optimal state trajectory and the deviation of the current complementarity variable trajectory from the optimal complementarity variable trajectory. The processor 603 further determines the online control input based on the optimal feedforward control trajectory and the feedback control to control the covariance of the states and the complementarity variables. The feedback control is based on the deviation of the current state trajectory from the optimal state trajectory, the deviation of the current complementarity variable trajectory from the optimal complementarity variable trajectory, the state feedback gain $K_k$ and the feedback gain $L_k$. The processor 603 further produces control commands for the actuators of the robotic arm 101 based on the determined online control input. The processor 603 further transmits control signals of the control commands to the actuators of the robotic arm 101, via the bus 609, to control the operation of the manipulation system 100.

The computing device 600 can be linked through the bus 609, optionally, to a display interface or user Interface (HMI) 647 adapted to connect the computing device 600 to a display device 649 and a keyboard 651, wherein the display device 649 can include a computer monitor, camera, television, projector, or mobile device, among others. In some implementations, the computer device 600 may include a printer interface to connect to a printing device, wherein the printing device can include a liquid inkjet printer, solid ink printer, large-scale commercial printer, thermal printer, UV printer, or dye-sublimation printer, among others.

The high-speed interface 611 manages bandwidth-intensive operations for the computing device 600, while the low-speed interface 613 manages lower bandwidth-intensive operations. Such allocation of functions is an example only. In some implementations, the high-speed interface 611 can be coupled to the memory 605, the user interface (HMI) 647, and to the keyboard 651 and the display 649 (e.g., through a graphics processor or accelerator), and to the high-speed expansion ports 615, which may accept various expansion cards via the bus 609. In an implementation, the low-speed interface 613 is coupled to the storage device 607 and the low-speed expansion ports 617, via the bus 609. The low-speed expansion ports 617, which may include various communication ports (e.g., USB, Bluetooth, Ethernet, wireless Ethernet) may be coupled to the one or more input/output devices 641. The computing device 600 may be connected to a server 653 and a rack server 655. The computing device 600 may be implemented in several different forms. For example, the computing device 600 may be implemented as part of the rack server 655.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling an operation of a manipulation system, wherein the manipulation system includes a robotic arm for performing a manipulation task of manipulating an object, the control system comprising: at least one processor; and a memory having instructions stored thereon that cause the at least one processor to:
   formulate a particle based optimization problem for covariance control of the manipulation system, based on a Stochastic Discrete-time Linear Complementarity Model (SDLCM) of the manipulation task, and a sample average approximation;
   solve the formulated particle based optimization problem using an important-particle algorithm to compute an optimal state trajectory, an optimal feedforward control trajectory, an optimal complementarity variable trajectory, a state feedback gain, and a complementarity feedback gain;
   collect, from one or more sensors associated with the manipulation system, measurements indicative of a current state trajectory and a current complementarity variable trajectory;
   compute a deviation of the current state trajectory from the optimal state trajectory and a deviation of the current complementarity variable trajectory from the optimal complementarity variable trajectory;
   determine an online control input based on the optimal feedforward control trajectory and a feedback control to control a covariance of states and complementarity variables of the manipulation system, wherein the feedback control is based on the deviation of the current state trajectory from the optimal state trajectory, the deviation of the current complementarity variable trajectory from the optimal complementarity variable trajectory, the state feedback gain, and the complementarity feedback gain;
   produce control commands for actuators of the robotic arm based on the determined online control input; and
   operate the actuators of the robotic arm according to the determined online control input by transmitting control signals of the control commands to the robotic arm.

2. The control system of claim 1, wherein the particle based optimization problem corresponds to a chance constrained optimization problem subject to stochastic complementarity constraints and a chance constraint.

3. The control system of claim 2, wherein the chance constraint is approximated using the sample average approximation.

4. The control system of claim 2, wherein the important-particle algorithm is iteratively executed until a termination condition is met, and wherein, to execute an iteration, the processor is further configured to:
   solve the particle based optimization problem with a number of particles to determine a controller;
   execute, based on the controller, Monte-Carlo simulation for each test particle of a number of test particles sampled from an uncertainty distribution, to determine particles that violate the chance constraint;
   select, from the determined particles, a number of worst particles; and
   add the number of worst particles to the number of particles.

5. The control system of claim 1, wherein the current state trajectory includes a current pose of the object, and wherein the current complementarity variable trajectory includes a current contact force between the robotic arm and the object.

6. The control system of claim 1, wherein the state of the manipulation system corresponds to a pose of the object, and wherein the complementarity variables of the manipulation system correspond to a contact force between the robotic arm and the object.

7. The control system of claim 1, wherein the manipulation task corresponds a pushing the object, reorientation of the object, gripping the object, or handling the object to assemble the object for manufacturing a product using a combination of pushing, reorienting, and gripping the object.

8. The control system of claim 1, wherein the one or more sensors associated with the manipulation system correspond to tactile sensors, force sensors, or torque sensors.

9. A method for controlling an operation of a manipulation system, wherein the manipulation system includes a robotic arm for performing a manipulation task of manipulating an object, the method comprising:
   formulating a particle based optimization problem for covariance control of the manipulation system, based on a Stochastic Discrete-time Linear Complementarity Model (SDLCM) of the manipulation task, and a sample average approximation;
   solving the formulated particle based optimization problem using an important-particle algorithm to compute an optimal state trajectory, an optimal feedforward control trajectory, an optimal complementarity variable trajectory, a state feedback gain, and a complementarity feedback gain;
   collecting, from one or more sensors associated with the manipulation system, measurements indicative of a current state trajectory and a current complementarity variable trajectory;
   computing a deviation of the current state trajectory from the optimal state trajectory and a deviation of the current complementarity variable trajectory from the optimal complementarity variable trajectory;
   determining an online control input based on the optimal feedforward control trajectory and a feedback control to control a covariance of states and complementarity variables of the manipulation system, wherein the feedback control is based on the deviation of the current state trajectory from the optimal state trajectory, the deviation of the current complementarity variable trajectory from the optimal complementarity variable trajectory, the state feedback gain, and the complementarity feedback gain; and
   producing control commands for actuators of the robotic arm based on the determined online control input; and operating the actuators of the robotic arm according to the determined online control input by transmitting control signals of the control commands to the robotic arm.

10. The method of claim 9, wherein the particle based optimization problem corresponds to a chance constrained optimization problem subject to stochastic complementarity constraints and a chance constraint.

11. The method of claim 10, wherein the chance constraint is approximated using the sample average approximation.

12. The method system of claim 10, wherein the important-particle algorithm is iteratively executed until a termination condition is met, and wherein execution of an iteration comprises:
    solving the particle based optimization problem with a number of particles to determine a controller;
    executing, based on the controller, Monte-Carlo simulation for each test particle of a number of test particles sampled from an uncertainty distribution, to determine particles that violate the chance constraint;
    selecting, from the determined particles, a number of worst particles; and
    adding the number of worst particles to the number of particles.

13. The method of claim 9, wherein the current state trajectory includes a current pose of the object, and wherein the current complementarity variable trajectory includes a current contact force between the robotic arm and the object.

14. The method of claim 9, wherein the state of the manipulation system corresponds to a pose of the object, and wherein the complementarity variables of the manipulation system correspond to a contact force between the robotic arm and the object.

15. The method of claim 9, wherein the manipulation task corresponds to one of a pushing the object, and reorientation of the object.

16. The method of claim 9, wherein the one or more sensors associated with the manipulation system correspond to tactile sensors, force sensors, or torque sensors.

17. A non-transitory computer-readable storage medium embodied thereon a program executable by a processor for performing a method for controlling an operation of a manipulation system, wherein the manipulation system includes a robotic arm for performing a manipulation task of manipulating an object, the method comprising:
    formulating a particle based optimization problem for covariance control of the manipulation system, based on a Stochastic Discrete-time Linear Complementarity Model (SDLCM) of the manipulation task, and a sample average approximation;
    solving the formulated particle based optimization problem using an important-particle algorithm to compute an optimal state trajectory, an optimal feedforward control trajectory, an optimal complementarity variable trajectory, a state feedback gain, and a complementarity feedback gain;
    collecting, from one or more sensors associated with the manipulation system, measurements indicative of a current state trajectory and a current complementarity variable trajectory;
    computing a deviation of the current state trajectory from the optimal state trajectory and a deviation of the current complementarity variable trajectory from the optimal complementarity variable trajectory;
    determining an online control input based on the optimal feedforward control trajectory and a feedback control to control a covariance of states and complementarity variables of the manipulation system, wherein the feedback control is based on the deviation of the current state trajectory from the optimal state trajectory, the deviation of the current complementarity variable trajectory from the optimal complementarity variable trajectory, the state feedback gain, and the complementarity feedback gain; and
    producing control commands for actuators of the robotic arm based on the determined online control input; and
    operating the actuators of the robotic arm according to the determined online control input by transmitting control signals of the control commands to the robotic arm.

18. The non-transitory computer-readable storage medium of claim 17, wherein the particle based optimization problem corresponds to a chance constrained optimization problem subject to stochastic complementarity constraints and a chance constraint.

19. The non-transitory computer-readable storage medium of claim 18, wherein the chance constraint is approximated using the sample average approximation.

20. A control system for controlling an operation of a manipulation system, wherein the manipulation system includes a robotic arm for performing a manipulation task of manipulating an object, the control system comprising: at least one processor; and a memory having instructions stored thereon that cause the at least one processor to:
    collect, from one or more sensors associated with the manipulation system, measurements indicative of a current state trajectory and a current complementarity variable trajectory;
    compute a deviation of the current state trajectory from an optimal state trajectory and a deviation of the current complementarity variable trajectory from an optimal complementarity variable trajectory;
        wherein a particle based optimization problem is solved using an important-particle algorithm to obtain the optimal state trajectory, the optimal complementarity variable trajectory, an optimal feedforward control trajectory, a state feedback gain, and a complementarity feedback gain, and wherein the particle based optimization problem is based on a Stochastic Discrete-time Linear Complementarity Model (SDLCM) of the manipulation task and a sample average approximation;
    determine an online control input based on the optimal feedforward control trajectory and a feedback control to control a covariance of states and complementarity variables of the manipulation system, wherein the feedback control is based on the deviation of the current state trajectory from the optimal state trajectory, the deviation of the current complementarity variable trajectory from the optimal complementarity variable trajectory, the state feedback gain, and the complementarity feedback gain; and
    produce control commands for actuators of the robotic arm based on the determined online control input; and
    operate the actuators of the robotic arm according to the determined online control input by transmitting control signals of the control commands to the robotic arm.

* * * * *